(12) United States Patent
Harris

(10) Patent No.: US 9,163,527 B2
(45) Date of Patent: Oct. 20, 2015

(54) BURNER PRESSURE TRANSDUCER THERMAL MANAGEMENT DESIGN

(75) Inventor: Thomas O. Harris, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 853 days.

(21) Appl. No.: 13/405,449

(22) Filed: Feb. 27, 2012

(65) Prior Publication Data

US 2013/0219902 A1  Aug. 29, 2013

(51) Int. Cl.
*F01D 25/32* (2006.01)

(52) U.S. Cl.
CPC ............. *F01D 25/32* (2013.01); *F23N 2025/04* (2013.01); *F23N 2900/05005* (2013.01)

(58) Field of Classification Search
CPC ... F23N 2025/04; F23N 2025/06; F23N 5/18; F23N 2900/05005; F23D 14/66; F01D 25/32
USPC ......... 60/803, 39.091, 779, 782, 785; 431/19, 431/11, 207; 324/464; 73/112.01, 112.02, 73/112.03
See application file for complete search history.

(56) References Cited

U.S. PATENT DOCUMENTS

| | | | |
|---|---|---|---|
| 5,499,531 A * | 3/1996 | Henderson | 73/64.45 |
| 6,892,584 B2 * | 5/2005 | Gilkison et al. | 73/736 |
| 6,971,238 B1 * | 12/2005 | Walker | 60/641.2 |
| 8,413,494 B1 * | 4/2013 | Lebron | 73/112.01 |
| 2003/0128736 A1 * | 7/2003 | Dalio et al. | 374/141 |
| 2005/0262845 A1 | 12/2005 | Martling et al. | |
| 2008/0034759 A1 | 2/2008 | Bulman et al. | |

FOREIGN PATENT DOCUMENTS

| | | | |
|---|---|---|---|
| EP | 1400750 A2 | 3/2004 | |
| EP | 1775517 A2 | 4/2007 | |
| EP | 1847685 A2 | 10/2007 | |

OTHER PUBLICATIONS

European Patent Office, Extended European Search Report, Aug. 8, 2013, 7 pages.

* cited by examiner

*Primary Examiner* — Phutthiwat Wongwian
*Assistant Examiner* — Thomas Burke
(74) *Attorney, Agent, or Firm* — Kinney & Lange, P.A.

(57) ABSTRACT

A system for reducing moisture in a burner pressure sensing line in a gas turbine engine. A water trap is mounted on the burner pressure sensing line with an inlet for receiving burner pressure air and an outlet for transferring burner pressure air to the sensor. A heat sink is positioned inside the water trap for condensing moisture contained in the burner pressure air. Finned tubes are used to passively control the temperature of the burner pressure line. A deadheaded chamber provides an alternative location for the moist air to condense when the gas is compressed at higher pressure.

20 Claims, 4 Drawing Sheets

BURNER PRESSURE TRANSDUCER THERMAL MANAGEMENT DESIGN

BACKGROUND

Gas turbine engines often channel hot/warm moist air to cold/freezing compartments within the engine. The warm moist air is likely to condense into liquid or freeze solid. As a result, both liquid and solid cause blockage of passages preventing correct channeling of the air if steps are not taken to prevent condensation.

The burner pressure sensing line is a pneumatic line that runs from the diffuser case port or burner pressure source to a pressure sensor associated within the electronic engine control housing. When this pneumatic line is blocked with moisture or ice, the burner pressure signal used to control engine thrust is erroneous. In some cases, this could result in a loss of thrust control which may be a significant safety issue. The cause of burner pressure sensing line blockage is the accumulation of moisture in the presence of freezing ambient conditions. This results in blockage of burner pressure passages, preventing the burner pressure from reaching a pressure sensor diaphragm.

Prior art methods have used water traps and weep holes to remove moisture, but have not been completely successful. Many burner pressure sensing systems include screens to protect the sensor from contaminates in the burner pressure air. However, the screens themselves can become contaminated, and are also more prone to freezing because the contamination absorbs and holds the moisture.

What is needed is a system for removing moisture from the burner pressure sensing lines, as well as a way to prevent the accumulation of moisture in a location that could block the lines.

SUMMARY

It has now been discovered that a water trap design is effective in causing moisture to condense and be removed from the air in the sensor line. The water trap is placed in an area of the engine that has lower temperatures than the rest of the engine area. An inlet is provided to receive burner pressure air from the diffuser case. An outlet is provided to send dry air to the pressure sensor in the electronic engine controller.

The inside of the water trap has a heat sink that promotes condensation of moisture in the air. The outside of the water trap may also have a heat sink to further aid condensation.

In addition, the system of this invention may have a portion of the burner pressure air line fitted with an external heat sink at a point proximate a hotter part of the engine area, such as proximate an oil tank. This heat sink warms the air as it flows to the sensor and maintains any remaining moisture in a gaseous state and prevents condensation.

In addition, the system also employs a deadheaded chamber that provides an alternative location for moisture to accumulate when the moist air in the sense line is compressed during high pressure conditions.

DETAILED DESCRIPTION

Figure 1:
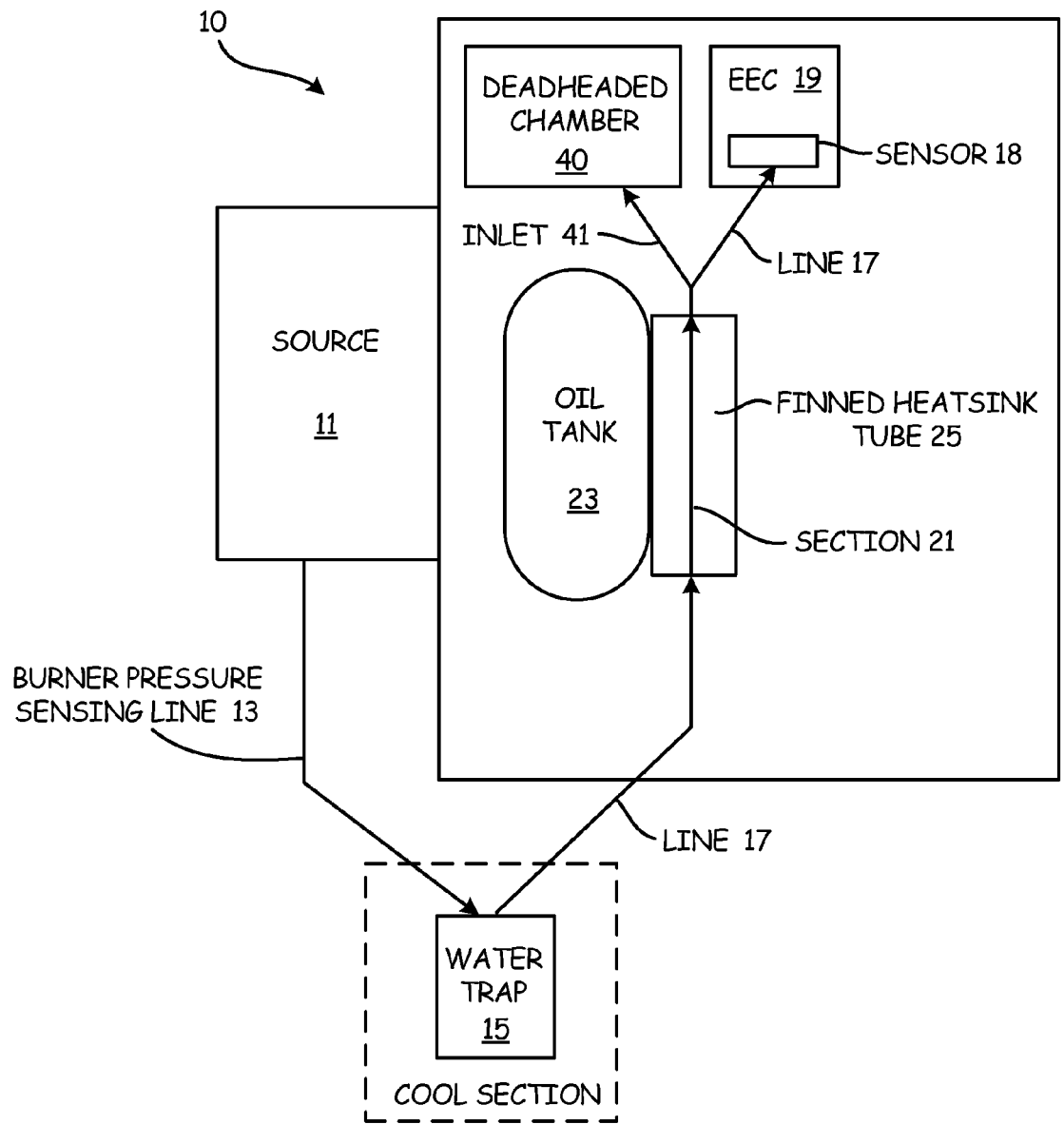
FIG. 1 is a schematic view of the system of this invention.
Figure 2:
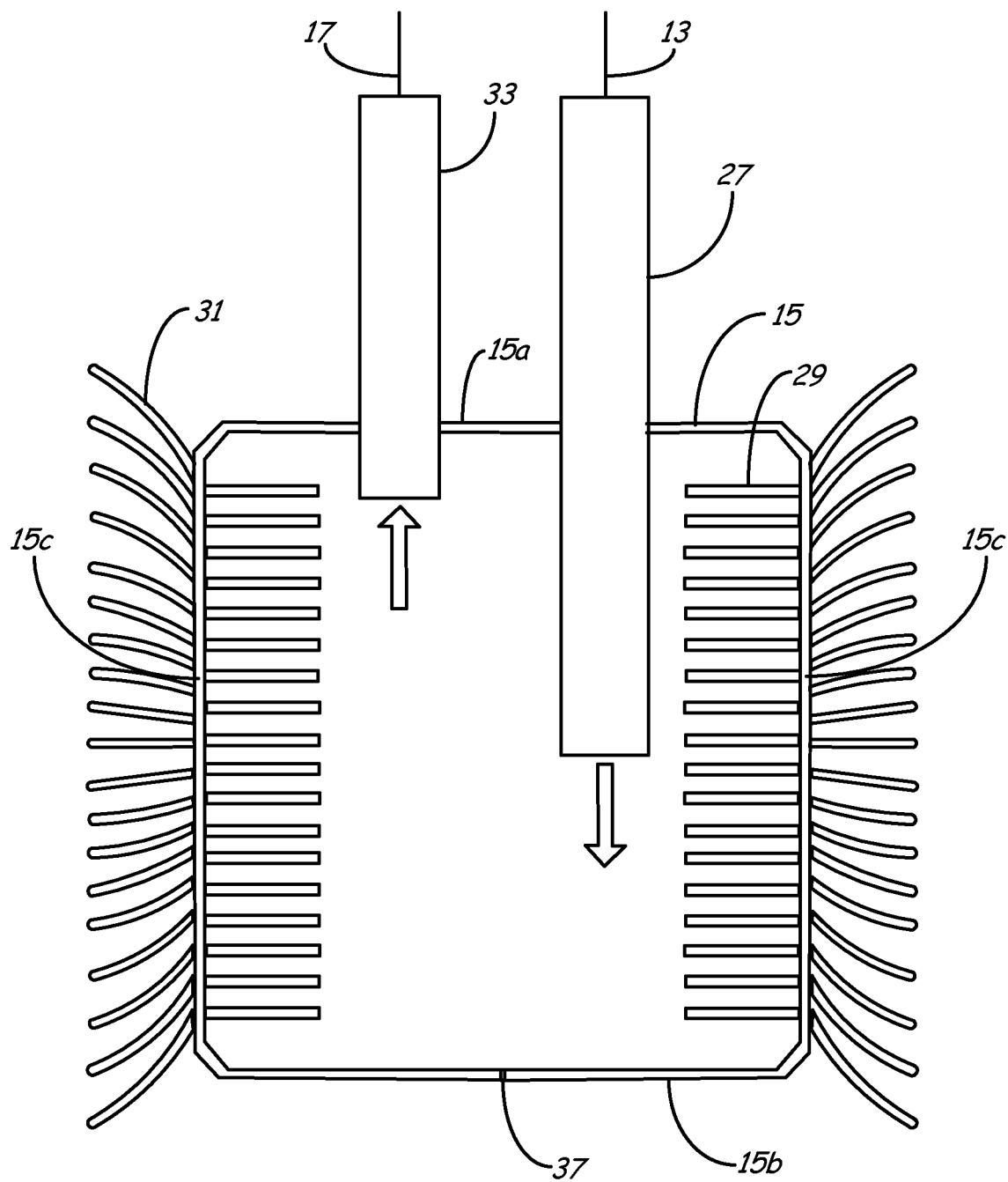
FIG. 2 is a section view of one element of the system of this invention.

As seen in FIG. 1, the water trap device and system 10 includes a source 11 of burner pressure air that passes from source 11 through burner pressure (Bp) sensing line 13 to water trap 15, shown in detail in FIG. 2, where moisture in the burner pressure air condenses. Source 11 is typically a port on the diffuser case. The system 10 also includes a deadheaded chamber 40 which provides an alternate location for moist air to condense instead of at the sensor location.

Water trap 15 is optimally placed in a relatively cool section of the gas turbine engine, which is also the lowest point, typically, in a burner pressure line sensing system. Burner pressure air exits water trap 15 in line 17 and travels to a sensor 18 and deadheaded chamber 40 proximate electronic engine control (EEC) structure 19.

In one embodiment, a section 21 of line 17 passes proximate a warmer section of the gas turbine engine, such as proximate oil tank 23 to receive heat and thus add to the condensing function. Finned heatsink tube 25, shown in detail in FIG. 4, re-heats the burner pressure gas within line 17 to evaporate any remaining moisture in the burner pressure gas. The burner pressure gas enters the conventional pressure sensor 18 within the electronic engine control structure 19. A reliable reading by the sensor 18 is achieved because substantially all the moisture has been removed from the burner pressure gas. Additional element 40 and line 41 are described below.

FIG. 2 illustrates an enlarged view of water trap 15 which is a chamber having a top 15a, bottom 15b and sides 15c. Water trap 15 is shown in section but in use has four sides, herein designated 15c. Water trap 15 can be cylindrical, square, rectangular or any shape as long as the sides 15c permit attachment of heat sinks as described below.

Figure 3A:
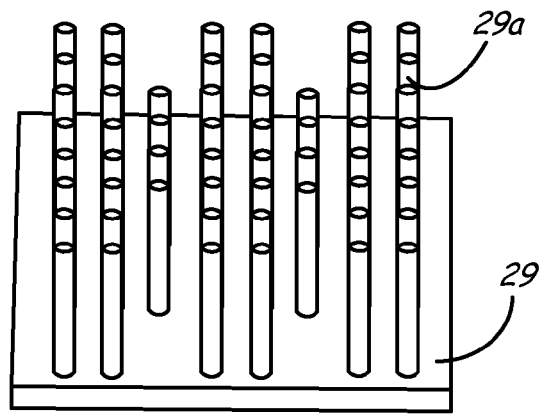
FIG. 3a and FIG. 3b are details of part of the element in FIG. 2.

Water trap 15 has an inlet 27 for introducing burner pressure air from source 11 via line 13 of FIG. 1, such as a diffuser case port. Burner pressure air inside water trap 15 is further cooled by passing over heat sink 29 which is mounted on sides 15c, and which provides lower temperature inside water trap 15. Heat sink 29 may be any effective heat sink. A pin head heat sink 29 in FIG. 3a takes up less volume than other heat sinks, as pins 29a show, and may be used as shown in FIG. 2 on two sides 15c, or more, of water trap 15.

Figure 3B:
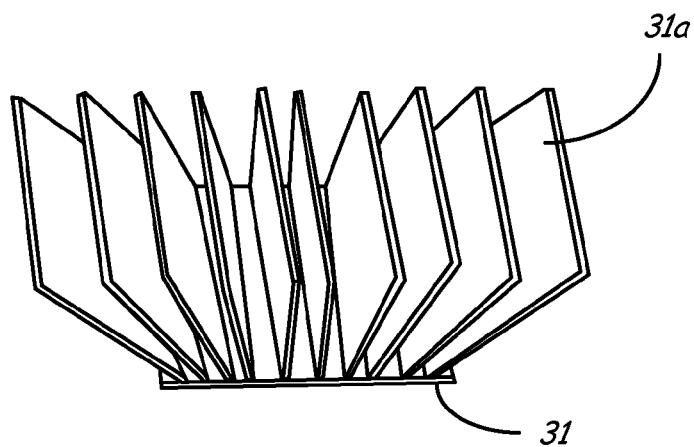

To further remove heat from the burner pressure air in water trap 15, a second heat sink 31 is mounted on the outside of water trap 15, also on at least two sides 15c. While any effective heat sink may be used, a flared fin heat sink 31 with flared fins 31a is shown in FIG. 3b and it may be used on the outside of water trap 15. Weep hole 37 in bottom 15b provides an outlet for condensed water in water trap 15.

Figure 4:
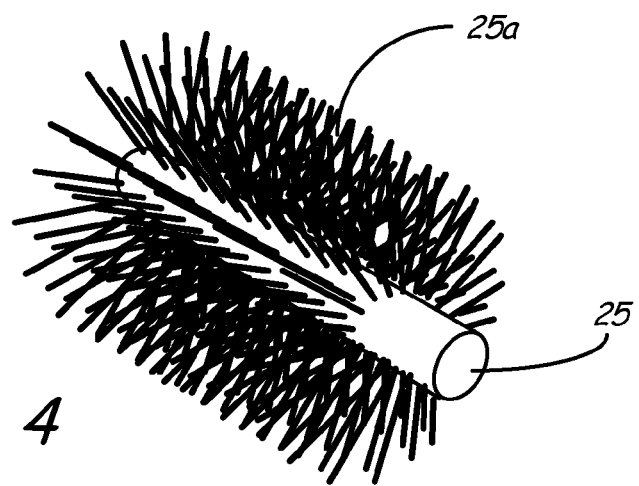
FIG. 4 is a detail of another element of the system of this invention.

Burner pressure air is then transferred out of water trap 15 via exit 33 to line 17 as previously described, and is transferred past oil tank 23. Third heat sink 25 further warms the burner pressure air to evaporate any residual moisture. FIG. 4 illustrates a finned heat sink tube 25 with fins 25a that has been found to be effective.

The burner pressure gas enters a pressure sensor 18 that is mounted within the engine electronic control structure (EEC) 19.

In addition, the burner pressure gas from line 17 enters a deadheaded chamber 40 providing an alternative location for the moist air to condense when the gas is compressed at higher pressure. This divides the moist air into two locations greatly reducing the amount of moisture that ends up in the passages leading to the sensor. Any moisture that accumulates or freezes in the deadheaded chamber 40 does not affect the pressure sensor reading.

Figure 2A:
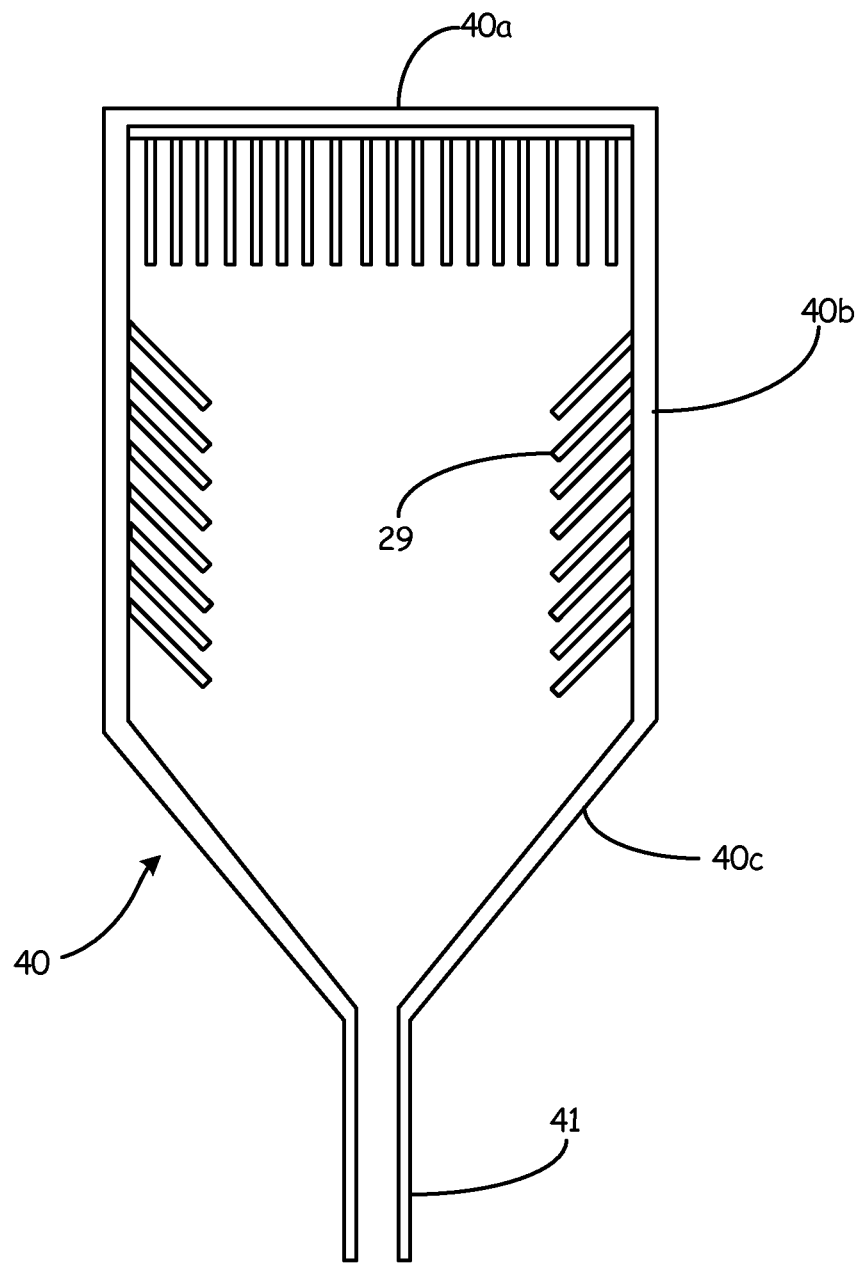
FIG. 2a is a section view of one element of the system of this invention.

FIG. 2a illustrates an enlarged view of deadheaded chamber 40 which is a chamber having a top 40a, bottom 40c and sides 40b. Deadheaded chamber 40 is shown in section but in use has four sides, herein designated 40b. Deadheaded chamber 40 can be cylindrical, square, rectangular or any shape as long as the sides 40b permit attachment of heat sinks 29 as described below.

Deadheaded chamber 40 has an inlet 41 for introducing burner pressure air from line 17 of FIG. 1. Burner pressure air inside deadheaded chamber 40 is further cooled by passing over heat sink 29 which is mounted on sides 40b, and which provides lower temperature inside deadheaded chamber 40. Heat sink 29 may be any effective heat sink. A pin head heat sink 29 in FIG. 3a has up less volume than other heat sinks and may be used as shown in FIG. 2a on two sides 40b, or more, of deadheaded chamber 40.

The addition of the heats sinks of this invention provides at least three functions. Improved cooling is achieved to condense more water from burner pressure air at water trap 15 as described above. Additional surface area via heat sinks 29 and 31 is provided for condensation to occur.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A burner pressure sensing system in a gas turbine engine, the system comprising:
    a pressure sensor;
    a burner pressure sensing line for sensing burner pressure, the burner pressure sensing line extending from a source of burner pressure air to the pressure sensor;
    a water trap fluidically coupled to the burner pressure sensing line;
    a first heat sink positioned inside the water trap for condensing moisture contained in the burner pressure air;
    an outlet on the water trap for removing condensed moisture; and
    a finned heat sink tube used to passively control a temperature of the burner pressure line to minimize condensation.

2. The system of claim 1, wherein the water trap is mounted in a cool portion of the gas turbine engine and wherein the heat sink inside the water trap is a pin heat sink.

3. The system of claim 1, which further includes a deadheaded chamber providing an alternative location for the moisture in the burner pressure air to condense when the burner pressure air is compressed at higher pressure.

4. The system of claim 3, wherein the deadheaded chamber comprises a pin heat sink, the pin heat sink having pins positioned on an inner wall of the deadhead chamber, the walls of the deadheaded chamber being slanted to allow drainage of accumulated moisture.

5. The system of claim 4, wherein the deadhead chamber is mounted near an engine electronic control structure (EEC) of the turbine engine.

6. The system of claim 1, which further includes a second heat sink mounted on the outside of a portion of the burner pressure sensing line closer to the pressure sensor proximate a hot portion of the gas turbine engine.

7. The system of claim 1, which further includes a third heat sink positioned on an outer wall of the water trap and wherein the third heat sink includes flared fins.

8. A device for reducing moisture in a burner pressure sensing line in a gas turbine engine having a burner pressure air source and a burner pressure sensor proximate an electronic engine control housing, the device comprising:
    a water trap mounted at a point on the burner pressure sensing line with an inlet for receiving burner pressure air from the burner pressure air source and an outlet for transferring burner pressure air to the burner pressure sensor;
    a heat sink positioned inside the water trap for condensing moisture contained in the burner pressure air;
    an outlet on the water trap for removing condensed moisture;
    a deadheaded chamber providing an alternative location for moist burner pressure air to condense when the burner pressure air is compressed at higher pressure.

9. The device of claim 8, wherein the water trap is mounted in a cool portion of the gas turbine engine.

10. The device of claim 8, wherein the heat sink inside the water trap is a pin heat sink.

11. The device of claim 8, which further includes a second heat sink positioned on the outside of the water trap.

12. The device of claim 11, wherein the second heat sink includes flared fins.

13. The device of claim 11, which further includes a third heat sink mounted on the outside of a portion of the burner pressure sensing line closer to the sensor than the water trap.

14. The device of claim 13, wherein the third heat sink mounted on the outside of a portion of the burner pressure line is proximate a hot portion of the gas turbine engine.

15. A method for reducing moisture in a burner pressure sensing line in a gas turbine engine having a burner pressure air source and a burner pressure sensor proximate an electronic engine control housing, comprising:
    supplying burner pressure air from the burner pressure air source into a water trap at a point on the burner pressure sensing line;
    condensing moisture contained in the burner pressure air using a heat sink inside the water trap;
    withdrawing condensed moisture through an outlet on the water trap; and
    supplying the burner pressure air from the water trap through the burner pressure sensing line to the pressure sensor.

16. The method of claim 15, further including dividing the burner pressure air into a deadheaded chamber and a pressure sensor chamber to greatly reduce the amount of moisture that ends up in the passages leading to the sensor, wherein walls of the deadheaded chamber are slanted to allow drainage of accumulated moisture.

17. The method of claim 15, wherein the water trap is mounted in a cool portion of the gas turbine engine and wherein the heat sink inside the water trap is a pin heat sink.

18. The method of claim 15, which further includes cooling the burner pressure air with a second heat sink positioned on the outside wall of the water trap.

19. The method of claim 18, wherein the second heat sink includes flared fins.

20. The method of claim 18, which further includes heating the burner pressure air at a location between the water trap and the pressure sensor using a heat exchanger mounted on the outside of the burner pressure sensing line.

* * * * *